United States Patent [19]

Klutz et al.

[11] Patent Number: 4,921,086

[45] Date of Patent: May 1, 1990

[54] DEVICE AND METHOD FOR UNIFORMLY DISTRIBUTING MATERIALS ON A CIRCULAR SURFACE

[75] Inventors: Hans J. Klutz, Erfstadt-Lechenich, Fed. Rep. of Germany; Bruno Flora, Pontpierre, Luxembourg; Gerard Gilles, Mersch, Luxembourg; Georges Wies, Dudelange, Luxembourg

[73] Assignees: Paul Wurth S.A., Luxembourg; Rheinische Braunkohlenwerke AG, Fed. Rep. of Germany

[21] Appl. No.: 353,119

[22] Filed: May 17, 1989

[30] Foreign Application Priority Data

May 25, 1988 [LU] Luxembourg .......................... 87226

[51] Int. Cl.$^5$ ............................................. B65G 11/00
[52] U.S. Cl. ........................................ 193/3; 414/301; 222/242; 239/687; 239/665; 193/23
[58] Field of Search .................... 198/536; 193/3, 16, 193/23; 414/299, 301; 222/239, 242; 406/162, 163; 239/651, 687, 688, 681, 665, 666, 683, 500, 522

[56] References Cited

U.S. PATENT DOCUMENTS

| | | | |
|---|---|---|---|
| 396,251 | 1/1889 | Adamson | 239/688 X |
| 1,237,629 | 8/1917 | Ford | 222/239 |
| 2,652,288 | 9/1953 | Sands | 406/162 |
| 2,786,609 | 3/1957 | Isserlis | 222/239 X |
| 3,791,592 | 2/1974 | Cobb | 414/301 X |
| 3,966,124 | 6/1976 | Sukup | 414/301 X |
| 3,989,194 | 11/1976 | Parker | 239/687 X |
| 4,216,914 | 8/1980 | O'Hanlon | 239/687 X |

Primary Examiner—Joseph E. Valenza
Assistant Examiner—James R. Bidwell
Attorney, Agent, or Firm—Fishman, Dionne & Cantor

[57] ABSTRACT

The device comprises an inclined rotating chute with adjustable angle of inclination, having an elongated flat sliding surface with a rectilinear longitudinal side provided with a retaining edge, the opposite longitudinal side being the pouring side and having overall the shape of an elongated "S" extending, without interruption and without corners, along the bottom end of the sliding surface as far as the bottom end of the rectilinear side.

2 Claims, 1 Drawing Sheet

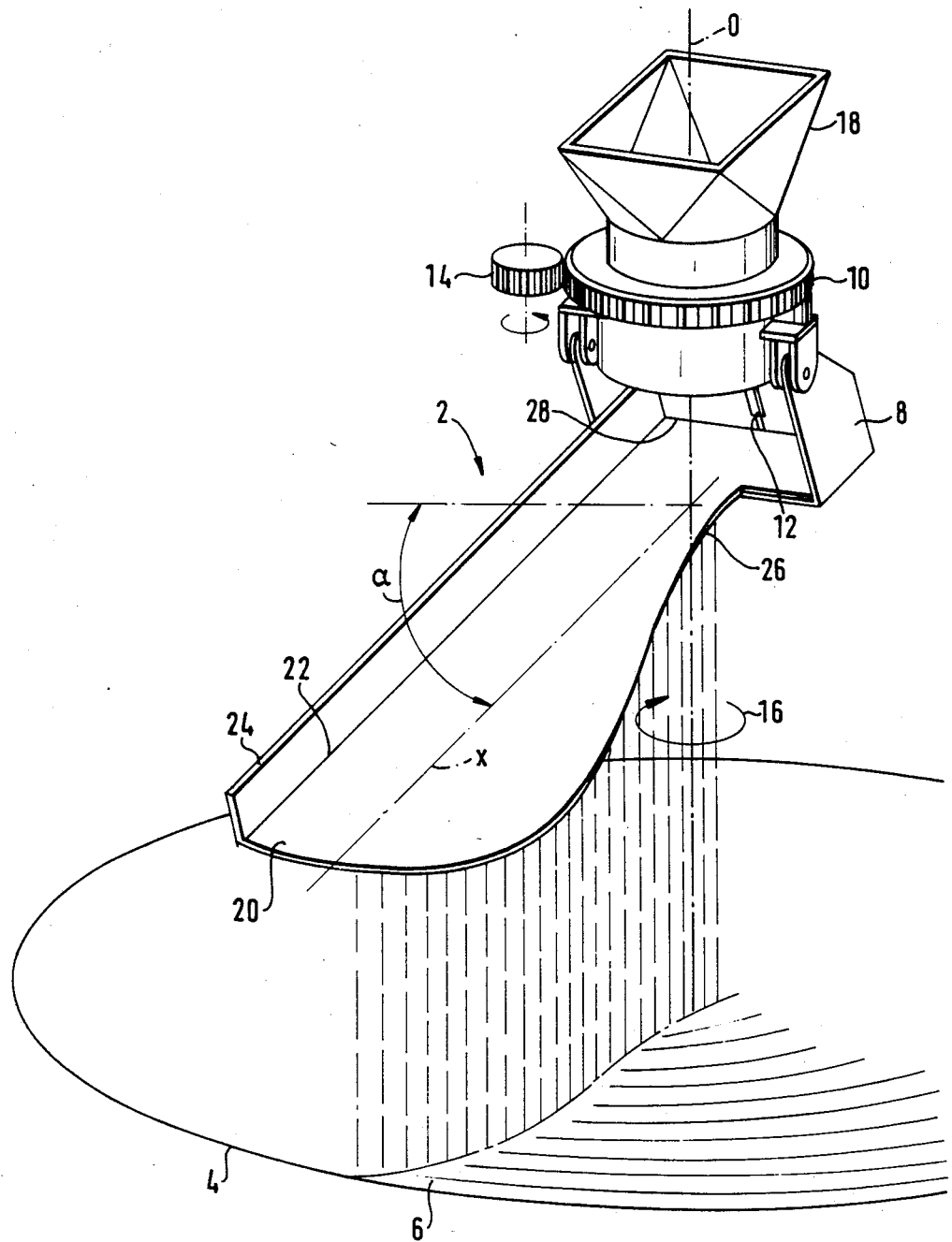

DEVICE AND METHOD FOR UNIFORMLY DISTRIBUTING MATERIALS ON A CIRCULAR SURFACE

TECHNICAL FIELD:

This invention pertains to devices for handling bulk solid materials.

BACKGROUND

In certain applications, bulk products in pulverulent, granular, powdery or other forms are poured in to a generally cylindrical enclosure in successive uniform layers and it is important for these materials to be distributed as uniformly as possible. This is the case, for example, with fluidized-bed lignite driers in which the material must be kept suspended in a fluidizing medium.

In fact, if the lignite is not distributed with the required degree of uniformity, the fluidized bed risks being disturbed in the locations where the distribution is irregular.

Another application is the distribution of pulverulent or powdery materials on the surface of a molten metal bath in a casting ladle. The materials in this case are metal treatment products such as, for example, desulphurization or metal-refining products or products included in the composition of the alloy so as to determine the properties thereof.

To ensure uniform distribution, the document EP-A1-0059411 proposes a distributor consisting of coaxial conical or frustoconical components which ensure distribution of the materials in coaxial frustoconical layers deposited in concentric circles on the surface of a metal bath. The layer thus deposited has, consequently, annular undulations, the width and the depth of which depend on the number of distribution components of the distributor.

Distribution devices consisting of a rotating pouring chute with an adjustable angle of inclination are known. These chutes also deposit the material in concentric circles or, if necessary, in a spiral if the angle of inclination is modified continuously. The layer, consequently, also has undulations in the radial direction. In other words, to ensure a minimum deposition thickness over the entire surface, whatever the device used, more material than necessary must be provided in order to take into account the fact that the thickness in the region of the circular depositions must be greater to guarantee adequate thickness between the annular depositions. In fact, not only does this undulating profile of the layer deposited by these devices conflict with the desired object from a technological or metallurgical point of view, but, moreover, it has an adverse effect on the manufacturing cost of the alloy in the case of casting ladles. These additives are, in fact, very costly materials and care must be taken, therefore, not to add more than is necessary.

SUMMARY OF THE INVENTION

The object of the present invention is to provide an improved device and distribution method which ensure more uniform spreading than the known devices.

A chute for distributing granular material over a circular surface is disclosed. The chute comprises an elongated flat sliding surface. The sliding surface extends from a top end to a bottom end and has a rectilinear longitudinal side, a retaining edge extending along the rectilinear longitudinal side and a pouring side. The pouring side is opposite the rectilinear longitudinal and has an overall shape of an elongated "S" extending without interruption and without corners along the bottom end of the sliding surface to the rectilinear longitudinal side.

A method for distributing granular material is also disclosed. The method includes supplying a stream of granular material to a rotatable chute having an adjustable angle of inclination, wherein the chute is of the type disclosed in the preceding paragraph, adjusting the angle of inclination of the chute and rotating the chute so that the material is poured along the entire length of the pouring side of the chute in a uniform screen extending from the center of the circular surface to the periphery of the circular surface.

BRIEF DESCRIPTION OF THE DRAWINGS

The figure shows a perspective view of a distribution chute of the present invention.

DESCRIPTION OF THE PREFERRED EMBODIMENT

This distribution chute, indicated by the reference number 2, is used to cover a circular surface 4 uniformly with a layer 6 of pulverulent, powdery or granular material.

To this end, the chute 2 is suspended pivotably by means of a clevis 8 from a ring 10 capable of rotating about the central vertical axis 0. The angle of inclination of the chute relative to the horizontal may be adjusted manually by means of an adjusting device 12, which is known per se and may simply consist of threaded male and female elements. The ring 10 is made to rotate by a drive pinion 14 under the action of a motor, not shown, so as to cause the chute 2 to rotate about the axis 0 in the direction indicated by the arrow 16. The material to be distributed is poured onto the chute 2 through the ring 10 and a hopper 18 which may, if necessary, be associated with a metering device, for example of the cellular rotor kind, or receive the material with the aid of a suitable conveyor. According to the present invention, the chute is designed so as to deposit the material in a single rotation over the entire surface 4. To this end, the chute comprises a flat sliding surface 20, the longitudinal side 22 of which, located at the front viewed in the direction of rotation, is rectilinear and has a retaining edge 24. The opposite longitudinal edge 26 forms along its entire length the edge for pouring the material.

The special design of the chute 2, in particular the shape of the pouring side 26, is based on the consideration of various criteria which either influence the falling trajectory of the material, or are imposed by the objective of uniform distribution. It must, in fact, be taken into account that the material is subject to acceleration on the chute under the influence of the force of gravity and the centrifugal force. Furthermore, the material is subject to the action of the Coriolis effect, which exerts an influence in the direction opposite to that of rotation of the chute. Moreover, to deposit a layer of uniform thickness, it must be taken into account that the linear speed of the chute increases from the center of the periphery, i.e. the surfaces swept by the chute per unit of time increase proportionally to the square of the radius. This means that the quantity of material poured over the end of the chute must be substantially greater than that which is poured over the top part of the chute and which falls into the central region.

To satisfy these criteria, the pouring side 26 has the overall shape of an elongated "S" which extends from the region of the rectilinear upper transverse side 28 without interruptions and without corners as far as the bottom end of the rectilinear side 22, forming, at the same time, the lower side opposite the transverse side 28. In the upper half, the pouring side 26 is closest to the longitudinal axis X of the chute. This enables little, but enough, material to be poured in the central region of the surface 4 above which the linear speed of the chute is slowest.

As the radius of deposition onto the surface 4 increases, the quantity of material poured must increase in order to compensate for the increase in the linear speed of rotation. This is performed automatically by naturally amplifying the deviation owing to the Coriolis effect which occurs in the opposite direction of rotation of the chute 2. However, in order to prevent, as a result of the Coriolis effect, all the material being poured from the chute before reaching the lower region of the chute, and so as to ensure that the rate of flow is at a maximum at the bottom end of the chute so as to cover the peripheral region of the surface 4 sufficiently, the pouring side 26 diverges, beyond the middle region of the chute, from the axis X of the latter, joining it again at the bottom end and extending as far as the corner of the opposite side 22. As a result of this shape of the side 26, the material is poured in the form of a continuous screen, extending and becoming thicker progressively from the center of the surface 4 as far as its external edge.

The angular speed of rotation of the chute 2 as well as its angle of inclination are determined empirically according to the nature of the material to be poured and the thickness of the layer to be deposited, it is preferable to adjust the rate of flow of the material such that the desired thickness of the layer 6 of material is reached only after the chute w has performed several complete rotations or sweeps.

Instead of determining the speed of the chute, it is also possible to modify the shape of the pouring side 26, for example by softening the "S"-shaped curves or making them more pronounced so as to be able to operate at a given speed.

Another possibility for influencing the sliding trajectory of the material on the chute is to provide deflection valves inside the ring so as to modify the point of impact of the material on the sliding surface of the chute.

Finally it remains to be emphasized that the invention is in no way limited to the two applications mentioned in the introduction, but may be implemented wherever the maximum possible uniformity of distribution is required.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A chute for distributing granular material over a circular surface, comprising:
    an elongated flat sliding surface extending from a top end to a bottom end and having a rectilinear longitudinal side,
    a retaining edge extending along the rectilinear longitudinal side, and
    a pouring side opposite the rectilinear longitudinal side, said pouring side having the overall slope of an elongated "S" extending without interruption and without corners along the bottom end of the sliding surface to the rectilinear longitudinal side.

2. A method for distributing a granular material over a circular surface, comprising:
    supplying a stream of granular material to a rotatable chute having an adjustable angle of inclination, said chute comprising:
        an elongated flat sliding surface extending from a top end to a bottom end and, having a rectilinear longitudinal side,
        a retaining edge extending along the rectilinear longitudinal side, and
        a pouring side opposite the rectilinear longitudinal side, said pouring side having the overall slope of an elongated "S" extending without interruption and without corners along the bottom end of the sliding surface to the rectilinear longitudinal side,
    adjusting the angle of inclination of the chute, and
    rotating the chute so that the material is poured along the entire length of the pouring side of the chute in a uniform screen extending from the center of the circular surface to the periphery of the circular surface.

* * * * *